C. R. RAMSEY.
Clod Crusher.
No. 104,353. Patented June 14, 1870.
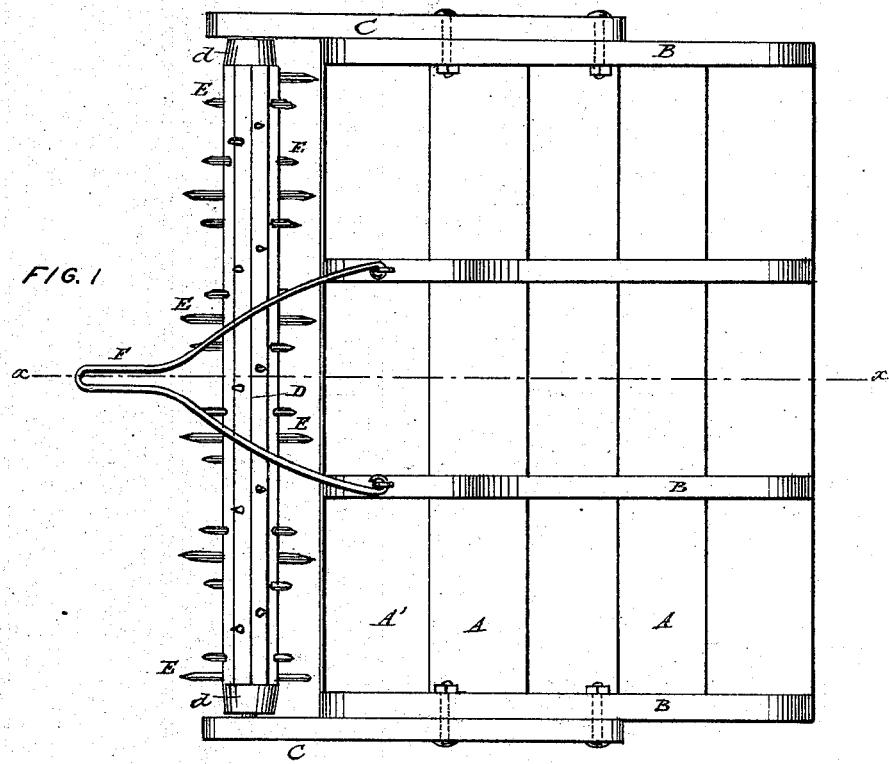
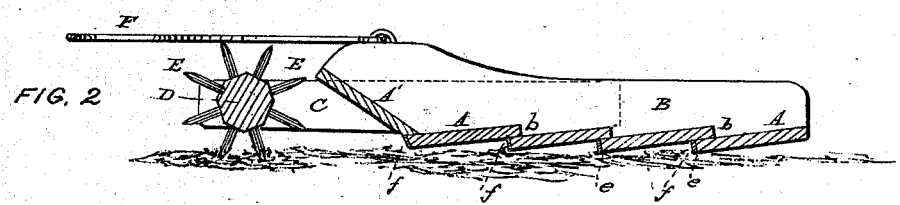
WITNESSES:
Fred. Artos
W. H. Voss.
INVENTOR:
C. R. Ramsey
per Edson Bros.
Attys.

United States Patent Office.

COMFORT R. RAMSEY, OF FARMER CENTRE, OHIO.

Letters Patent No. 104,353, dated June 14, 1870.

IMPROVEMENT IN CLOD-CRUSHERS AND PULVERIZERS.

The Schedule referred to in these Letters Patent and making part of the same.

*To all whom it may concern:*

Be it known that I, COMFORT R. RAMSEY, of Farmer Centre, in the county of Defiance and State of Ohio, have invented an Improved Clod-Crusher and Pulverizer; and I do hereby declare that the following is a full, clear, and exact description thereof, reference being had to the accompanying drawing and to the letters of reference marked thereon.

Drawing.

Figure 1 is a ground plan view of my improved device, and

Figure 2 is a central sectional elevation, taken on a line *x x* of fig. 1.

This invention has for its object to provide a device to crush clods, and for evening the surface of the ground ready for planting; and It consists of a revolving roller, provided with teeth projecting from its exterior surface, in combination with a series of boards or planks laid lengthwise with said revolving roller, and secured together by cross-bars, in such a manner that the first and forward bottom plank or strip, shall be secured to the cross-bars, its rear edge being overlapped by the front edge of the secured plank, thus forming a shoulder, and so on through the series of planks or strips.

Similar letters of reference refer to like parts in each of the figures.

To enable others informed in the art to which my invention relates, to construct and use the same, I will proceed to describe its construction and mode of operation.

In the annexed drawing forming a part of this specification—

A A refer to straight plain pieces of plank, the under or rear side of the foremost one being overlapped by the upper forward side of the second, and so on through the series, thus forming shoulders *e e*.

The head plank A' is secured to the forward edges of the cross-bars, as clearly shown in fig. 2.

B B are the cross-bars, to which the planks A A and A' are attached.

The lower edges of these cross-bars are so formed as to be the exact counterpart of the contour of the upper surfaces of the planks A A. Thus constructed, it will be seen that shoulders *b b* are formed for the bearings of the rear edges of the parallel planks A A.

To prevent the shoulders *e e* from wearing off, they are beveled on their faces with some suitable metal, as indicated by the letters *f f* in fig. 2.

Projecting arms C C are bolted or otherwise suitably fastened to the end cross-bars; within their outer ends the revolving octagonal toothed roller D is hung, the ends of said roller being provided with metal bands or thimbles *d d*, to prevent them from breaking while revolving upon their journals.

E E are teeth, secured in a permanent manner to the roller D. They project from its exterior surface, as shown in fig. 2, and are arranged from one end to the other in the form of a screw. Having this uniform arrangement upon the roller, they become more effectual and practical in breaking clods than they would be if indiscriminately attached.

Any amount of weight may be placed upon the platform or planks, to hold them and the roller snugly to the ground.

F is a rod or wire, being the point of draft to which the horses are attached.

I do not confine myself to any particular form of roller, or to any particular arrangement of teeth thereon.

Having thus described my invention,

What I claim as new, and desire to secure by Letters Patent of the United States, is—

The combination and arrangement of the toothed roller D and the overlapping planks A A', substantially as shown and described.

In testimony whereof I have signed my name to this specification, in the presence of two attesting witnesses, this 14th day of March, 1870, at Bryan, Ohio.

COMFORT R. RAMSEY.

Witnesses:
R. J. GIBBONS,
J. SCHARTZER.